(12) United States Patent
Mota et al.

(10) Patent No.: US 8,398,316 B2
(45) Date of Patent: Mar. 19, 2013

(54) SECURITY CAMERA ASSEMBLY

(75) Inventors: Iwan Mota, Toronto (CA); Joel Matlin, Toronto (CA); Jon Carver, Millbrae (CA); Kimberlee Hayashi, San Francisco, CA (US); Tark Abed, Palo Alto, CA (US)

(73) Assignee: Alarmforce Industries Inc., Toronto, Ontario (CA)

( * ) Notice: Subject to any disclaimer, the term of this patent is extended or adjusted under 35 U.S.C. 154(b) by 0 days.

(21) Appl. No.: 13/011,462

(22) Filed: Jan. 21, 2011

(65) Prior Publication Data

US 2011/0243545 A1 Oct. 6, 2011

Related U.S. Application Data

(63) Continuation-in-part of application No. 12/503,531, filed on Jul. 15, 2009, now abandoned.

(60) Provisional application No. 61/081,259, filed on Jul. 16, 2008.

(51) Int. Cl.
*G03B 17/00* (2006.01)
(52) U.S. Cl. ............... 396/427; 248/215; 248/225.21
(58) Field of Classification Search .......... 396/427; 248/215, 225.21
See application file for complete search history.

(56) References Cited

U.S. PATENT DOCUMENTS

| | | | |
|---|---|---|---|
| 2,920,853 A | 1/1960 | Bufogle | |
| 3,578,282 A | 5/1971 | Olsen | |
| 3,731,897 A * | 5/1973 | Price | 248/230.1 |
| 4,059,248 A | 11/1977 | Kuntz | |
| 4,141,524 A | 2/1979 | Corvese, Jr. | |
| 4,320,949 A | 3/1982 | Pagano | |
| D267,050 S | 11/1982 | Ostrom | |
| D274,037 S | 5/1984 | Crim et al. | |
| D283,031 S | 3/1986 | Sadre-Marandi et al. | |
| 4,618,886 A | 10/1986 | Mooney | |
| 4,794,675 A | 1/1989 | Bisconti | |
| 4,817,239 A | 4/1989 | Campbell et al. | |
| D305,299 S | 1/1990 | Freeman | |
| 5,055,864 A | 10/1991 | Slikkers | |
| 5,260,731 A | 11/1993 | Baker, Jr. | |
| 5,413,297 A | 5/1995 | Adams | |
| 5,487,517 A | 1/1996 | Smith | |
| 5,529,273 A | 6/1996 | Benthin | |
| 5,538,212 A * | 7/1996 | Kennedy | 248/215 |
| 5,619,395 A | 4/1997 | McBride | |
| 5,678,797 A | 10/1997 | Gogan | |
| 5,927,681 A | 7/1999 | Ovelman | |
| 6,073,899 A | 6/2000 | Omrani | |
| 6,145,677 A | 11/2000 | Corniel | |
| 6,239,841 B1 | 5/2001 | Verstockt et al. | |
| 6,311,851 B1 | 11/2001 | Knudsen, Sr. et al. | |

(Continued)

OTHER PUBLICATIONS

International Search Report from PCT/CA2009/000996 published on Oct. 7, 2009; Daniela Savin.

(Continued)

*Primary Examiner* — W. B. Perkey
*Assistant Examiner* — Linda B Smith
(74) *Attorney, Agent, or Firm* — Dunlap Codding, PC

(57) ABSTRACT

A security camera assembly has a bracket, a housing, and a camera. The bracket includes a top plate having a front end and a back end, a front leg extending from the front end of the top plate in a first direction generally perpendicular to the top plate, and a back leg extending from the back end of the top plate generally in the first direction. A housing is connected to the front leg of the bracket, the housing and the front leg of the bracket defining therebetween a camera receiving space. A camera is disposed in the camera receiving space. A method for mounting the security camera assembly is also disclosed.

22 Claims, 19 Drawing Sheets

U.S. PATENT DOCUMENTS

| | | |
|---|---|---|
| 6,364,260 B1 | 4/2002 | Lorincz et al. |
| 6,418,010 B1 | 7/2002 | Sawyer |
| D491,054 S | 6/2004 | Caterinacci, Jr. |
| D494,051 S | 8/2004 | Klein et al. |
| 6,854,610 B2 | 2/2005 | Adams |
| D508,251 S | 8/2005 | Tuccinardi et al. |
| 6,970,202 B1 | 11/2005 | Glogan et al. |
| 7,052,135 B2 * | 5/2006 | Takeda et al. ............. 351/245 |
| 7,128,354 B2 | 10/2006 | Wu |
| 7,219,866 B2 * | 5/2007 | Depay et al. ............ 248/229.22 |
| 7,322,551 B2 | 1/2008 | Simonsen |
| 7,789,574 B2 | 9/2010 | Broberg |
| 7,909,295 B2 * | 3/2011 | Powers et al. ............. 248/121 |
| 8,152,389 B1 * | 4/2012 | Lammens ................. 396/419 |
| 2001/0023914 A1 * | 9/2001 | Oddsen, Jr. ............. 248/274.1 |
| 2002/0130963 A1 * | 9/2002 | Gelbard .................. 348/360 |
| 2003/0095185 A1 | 5/2003 | Naifeh |
| 2004/0164211 A1 | 8/2004 | Orona |
| 2005/0188507 A1 | 9/2005 | Adams et al. |
| 2009/0010637 A1 * | 1/2009 | DeWitt .................... 396/428 |
| 2010/0104274 A1 * | 4/2010 | Rowen et al. ............. 396/425 |

OTHER PUBLICATIONS http://www.jimsmobile.com/data_mounting_brackets.htm.

* cited by examiner

SECURITY CAMERA ASSEMBLY

CROSS-REFERENCE

The present application is a continuation-in-parts of U.S. patent application Ser. No. 12/503,531 filed on Jul. 15, 2009 which claims priority to U.S. Provisional Patent Application No. 61/081,259 filed on Jul. 16, 2008, the entirety of both of which is incorporated herein by reference.

FIELD OF THE INVENTION

The present invention relates to a security camera assembly.

BACKGROUND

Most devices used to attach a security camera to the exterior of a house, currently on the market, involve complicated installations which include drilling holes for mounting the hardware, running cables from inside the house to the outside, and can result in permanent marks on walls, overhangs, or anywhere the camera may be secured. Also, these complex installations typically limit the use of the camera as simply an exterior camera. They also prevent the camera from being easily moved. Furthermore, the installations are usually costly due to labour and materials.

Therefore, there is a need for a security camera assembly that can be easily installed and removed.

SUMMARY

It is an object of the present invention to ameliorate at least some of the inconveniences present in the prior art.

It is also an object of the present invention to provide a security camera assembly which simplifies the installation of a variety of cameras by removing the need for drilling and running cables through walls and ceilings.

It is another object of the present invention to provide a security camera assembly that can be easily moved from one location to another.

In one aspect, a security camera assembly is provided which has a bracket. The bracket includes a top plate having a front end and a back end, a front leg extending from the front end of the top plate in a first direction generally perpendicular to the top plate, a back leg extending from the back end of the top plate generally in the first direction, and at least one passage extending in the top plate from the front leg to the back leg. The security camera assembly also has a housing connected to the front leg of the bracket, the housing and the front leg of the bracket defining therebetween a camera receiving space, and a camera disposed in the camera receiving space. The camera has at least one wire extending therefrom. A portion of the wire is disposed in the at least one passage and extends at least to the back end of the top plate.

In a further aspect, a mounting plate is connected to the front leg. The mounting plate is generally parallel to the front leg. The housing is connected to the mounting plate. The camera receiving space is defined between the housing and the mounting plate.

In an additional aspect, the mounting plate is connected to the front leg by at least one fastener disposed in at least one aperture in the mounting plate and in at least one corresponding aperture in the front leg.

In a further aspect, the back leg is inclined towards the front leg.

In an additional aspect, the back leg has a top end attached to the back end of the top plate and a bottom end opposite the top end. A distance from the bottom end to the front leg is smaller than a width of one of a door, a window frame, and a fence for which the security camera assembly is configured to be mounted onto, such that the back leg is biased against the one of the door, the window frame, and the fence when mounted thereon.

In a further aspect, the at least one passage is defined by a channel extending along the top plate from the front leg to the back leg.

In an additional aspect, the channel also extends along at least a portion of the front leg and at least a portion of the back leg.

In a further aspect, a bottom end of the back leg curves away from the front leg.

In another aspect, a method for mounting a security camera assembly onto one of a door, a window frame, and a fence is provided. The security camera assembly has a bracket, the bracket including a top plate having a front end and a back end, a front leg extending from the front end of the top plate in a first direction generally perpendicular to the top plate, and a back leg extending from the back end of the top plate generally in the first direction. The method comprises: connecting a camera to the front leg of the bracket; connecting a housing to the front leg of the bracket such that the camera is disposed between the housing and the bracket; sliding the bracket onto one of a top and a side of the one of the door, the fence, and the window frame such that the top plate rests on the one of the top and the side of the one of the door, the fence, and the window frame; and disposing a camera wire in at least one passage extending through the top plate from the front leg to the back leg, the wire extending at least to the back end of the top plate.

In an additional aspect, the method also comprises connecting a mounting plate to the front leg such that the mounting plate is generally parallel to the front leg. Connecting the camera to the front leg includes connecting the camera to the mounting plate. Connecting the housing to the front leg includes connecting the housing to the mounting plate.

In a further aspect, connecting the mounting plate to the front leg includes fastening the mounting plate to the front leg by disposing at least one fastener in at least one aperture located in the mounting plate and at least one corresponding aperture located in the front leg.

In an additional aspect, connecting the housing to the mounting plate includes fastening the housing to the mounting plate.

In a further aspect, disposing the camera wire in at least one passage includes disposing the camera wire in a channel defining the at least one passage.

In yet another aspect, a security camera assembly is provided which has a bracket. The bracket includes a top plate having a front end and a back end, a front leg extending from the front end of the top plate in a first direction generally perpendicular to the top plate, and a back leg extending from the back end of the top plate generally in the first direction. The security camera assembly also has a housing connected to the front leg of the bracket, the housing and the front leg of the bracket defining therebetween a camera receiving space, and a camera disposed in the camera receiving space. The housing is disposed outside a space defined between the camera and the front leg of the bracket.

In an additional aspect, a mounting plate is connected to the front leg. The mounting plate is generally parallel to the front leg. The housing is connected to the mounting plate. The camera receiving space is defined between the housing and the mounting plate. The housing is disposed outside a space defined between the camera and the mounting plate.

In a further aspect, the mounting plate is connected to the front leg by at least one fastener disposed in at least one aperture in the mounting plate and in at least one corresponding aperture in the front leg.

In an additional aspect, the bracket has at least one passage extending in the top plate from the front leg to the back leg. The camera has at least one wire extending therefrom. A portion of the wire is disposed in the at least one passage.

In a further aspect, the at least one passage is defined by a channel extending along the top plate from the front leg to the back leg.

In an additional aspect, the channel also extends along at least a portion of the front leg and at least a portion of the back leg.

In a further aspect, a bottom end of the back leg curves away from the front leg.

In an additional aspect, the back leg is inclined towards the front leg.

In a further aspect, the back leg has a top end attached to the back end of the top plate and a bottom end opposite the top end. A distance from the bottom end to the front leg is smaller than a width of one of a door, a window frame, and a fence for which the security camera assembly is configured to be mounted onto, such that the back leg is biased against the one of the door, the window frame, and the fence when mounted thereon.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
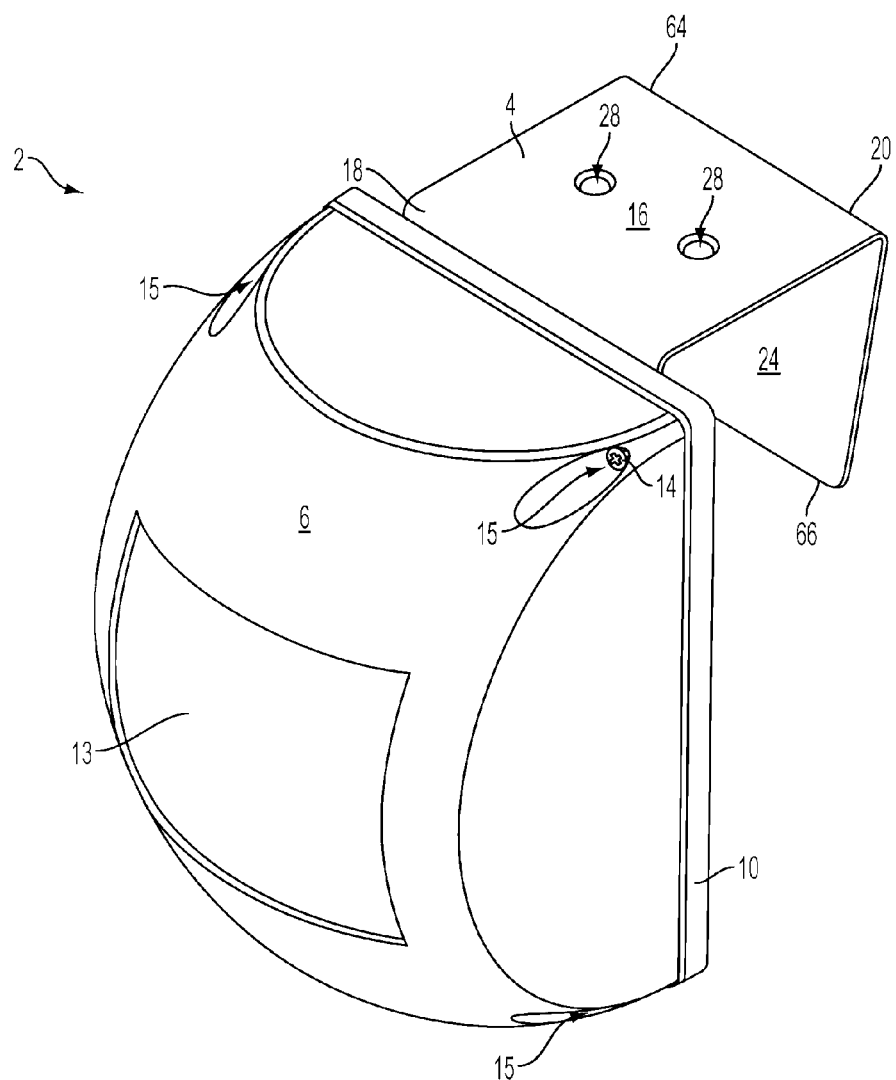
FIG. 1 is a perspective view, taken from a front, left side of a security camera assembly in accordance with the present invention.
Figure 2:
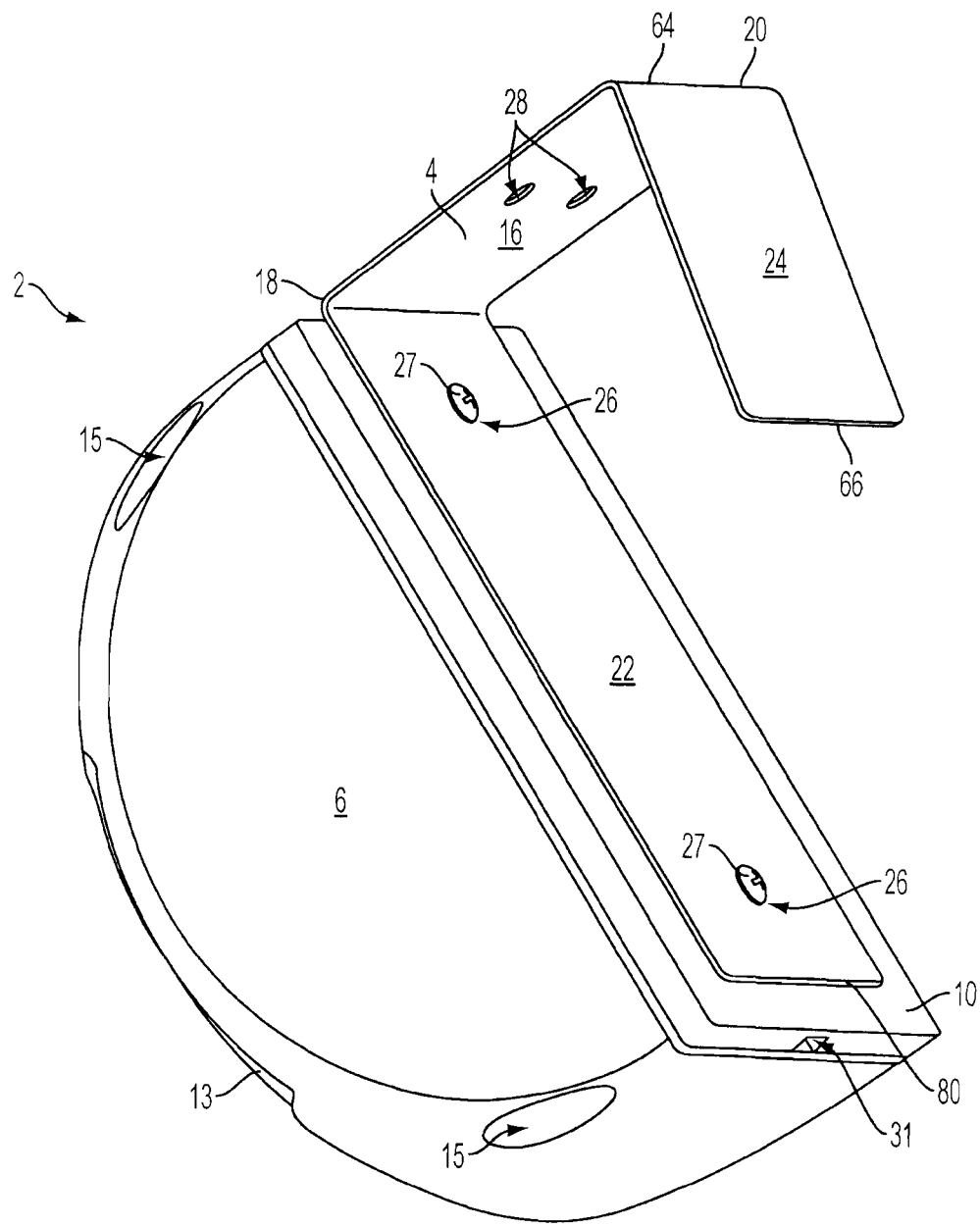
FIG. 2 is a perspective view, taken from a rear, left side of the security camera assembly of FIG. 1.
Figure 3:
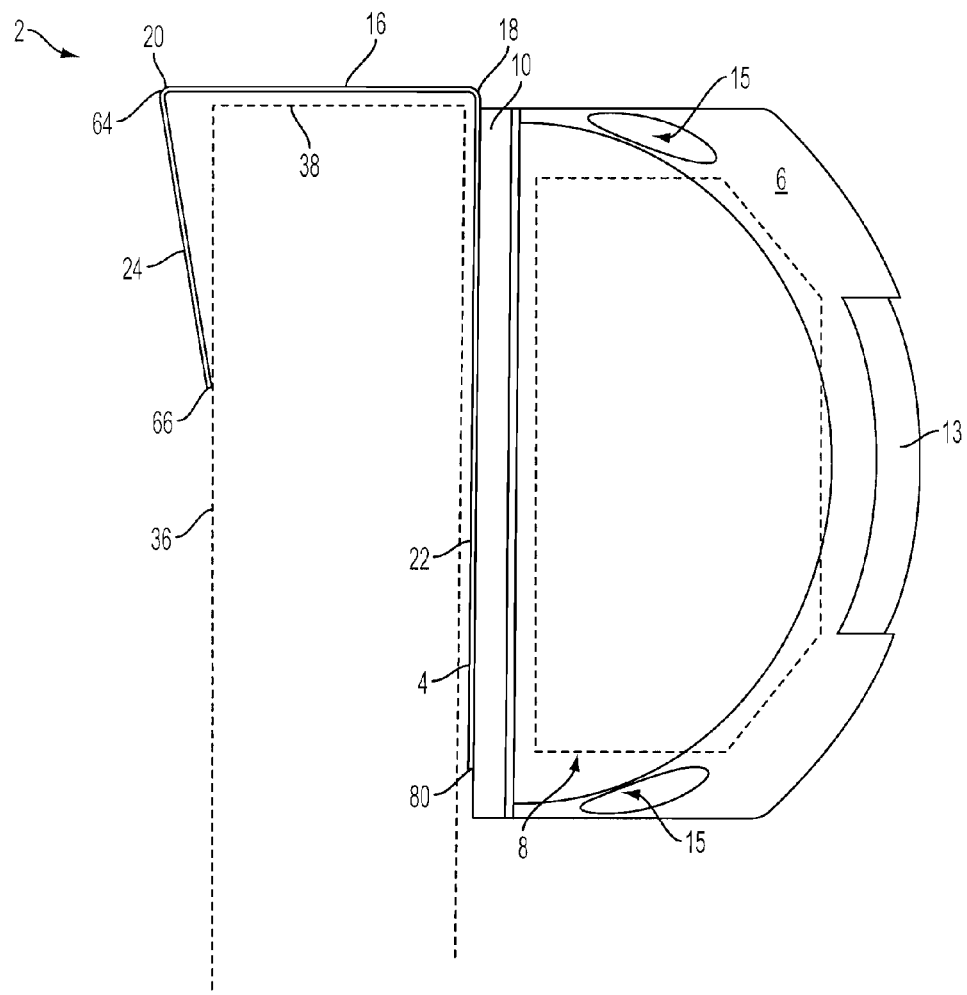
FIG. 3 is a right side view of the security camera assembly of FIG. 1.
Figure 9:
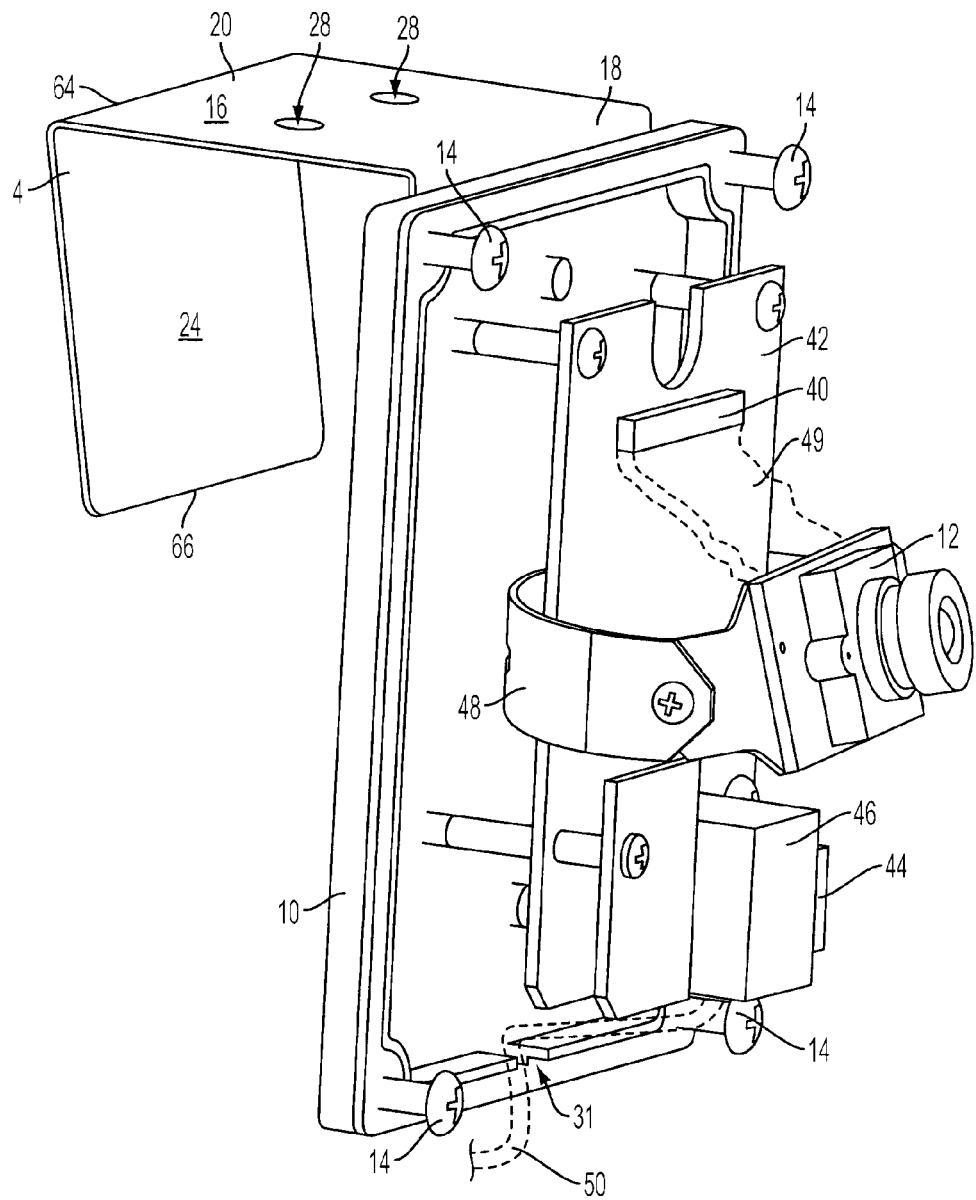
FIG. 9 is a perspective view, taken from a front, right side of the security camera assembly of FIG. 1 with the housing removed.

A security camera assembly 2, shown in FIGS. 1 to 3, has a bracket 4, a housing 6, a camera receiving space 8 shown in phantom (FIG. 3), a mounting plate 10, and a camera 12 (FIG. 9). The camera receiving space 8 is located between the housing 6 and the mounting plate 10. The camera 12 is disposed in the camera receiving space 8 as described in greater detail below.

The security camera assembly 2 is designed to be mounted onto one of a door 36, as shown in phantom in FIG. 3, a window frame (not shown), or a fence (not shown). However, it is contemplated that the security camera assembly 2 could be designed to be mounted onto any other device or element having a top edge and two side edges extending therefrom in one direction away from the top edge.

The housing 6 has a window 13 for the camera to film and/or take pictures through. The housing 6 is fastened to the mounting plate 10 via four fasteners 14 located in openings 15 which are preferably screws or bolts. However, it is contemplated that any other suitable fastener could be used for attaching the housing 6 to the mounting plate 10. Moreover, it is contemplated that the housing 6 could be connected directly to the bracket 4, as described below in more detail. It is also contemplated that the housing 6 could be integrally formed with the mounting plate 10.

Figure 4:
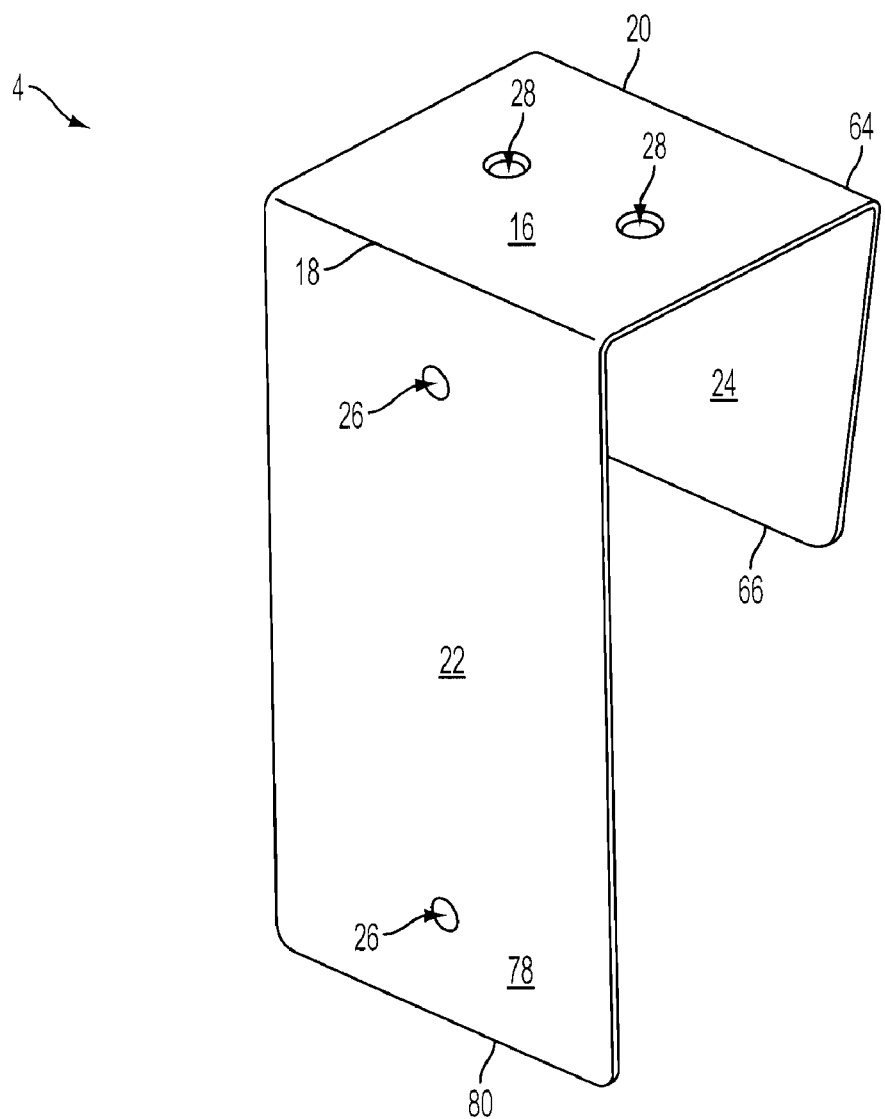
FIG. 4 is a perspective view, taken from a front, left side of the bracket of the security camera assembly of FIG. 1.
Figure 5:
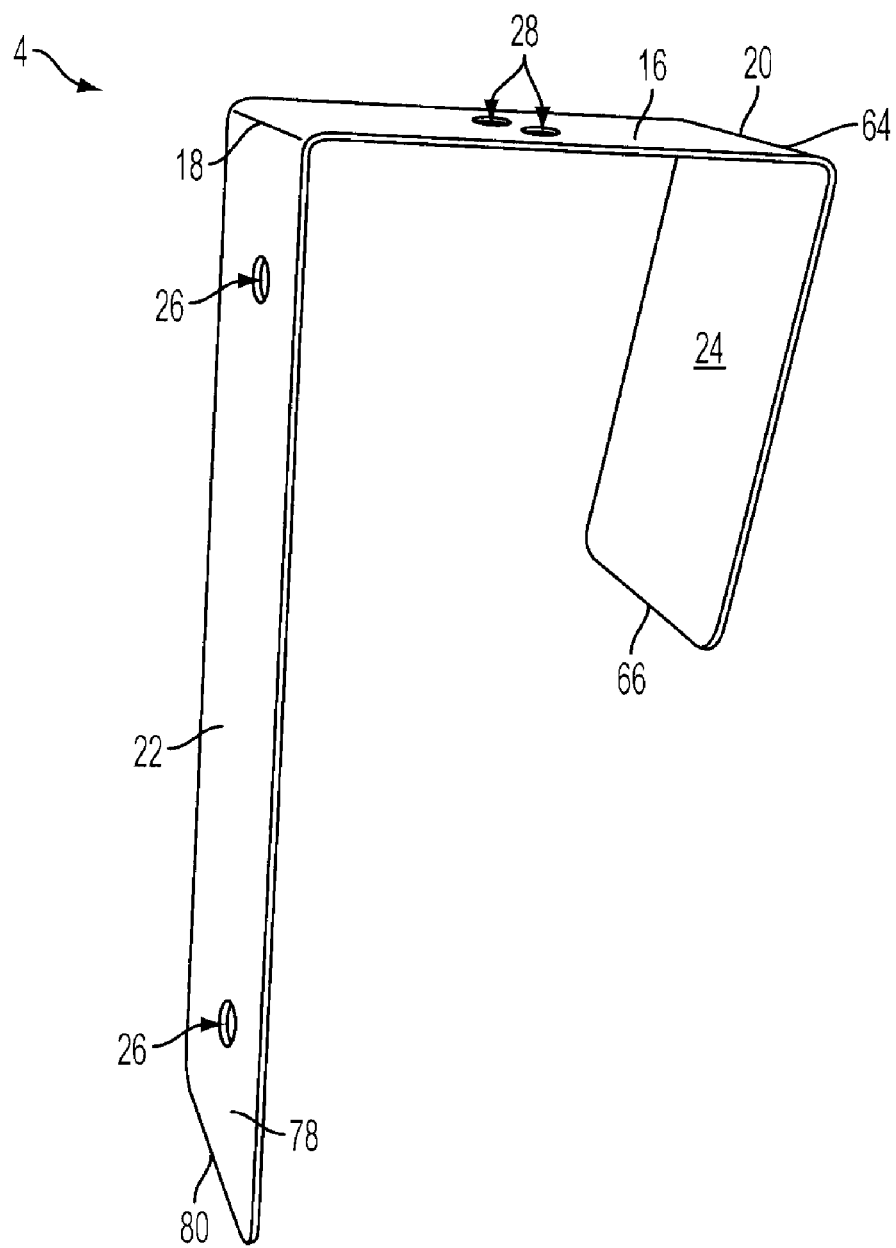
FIG. 5 is another perspective view, taken from a front, left side of the bracket of FIG. 4.
Figure 6:
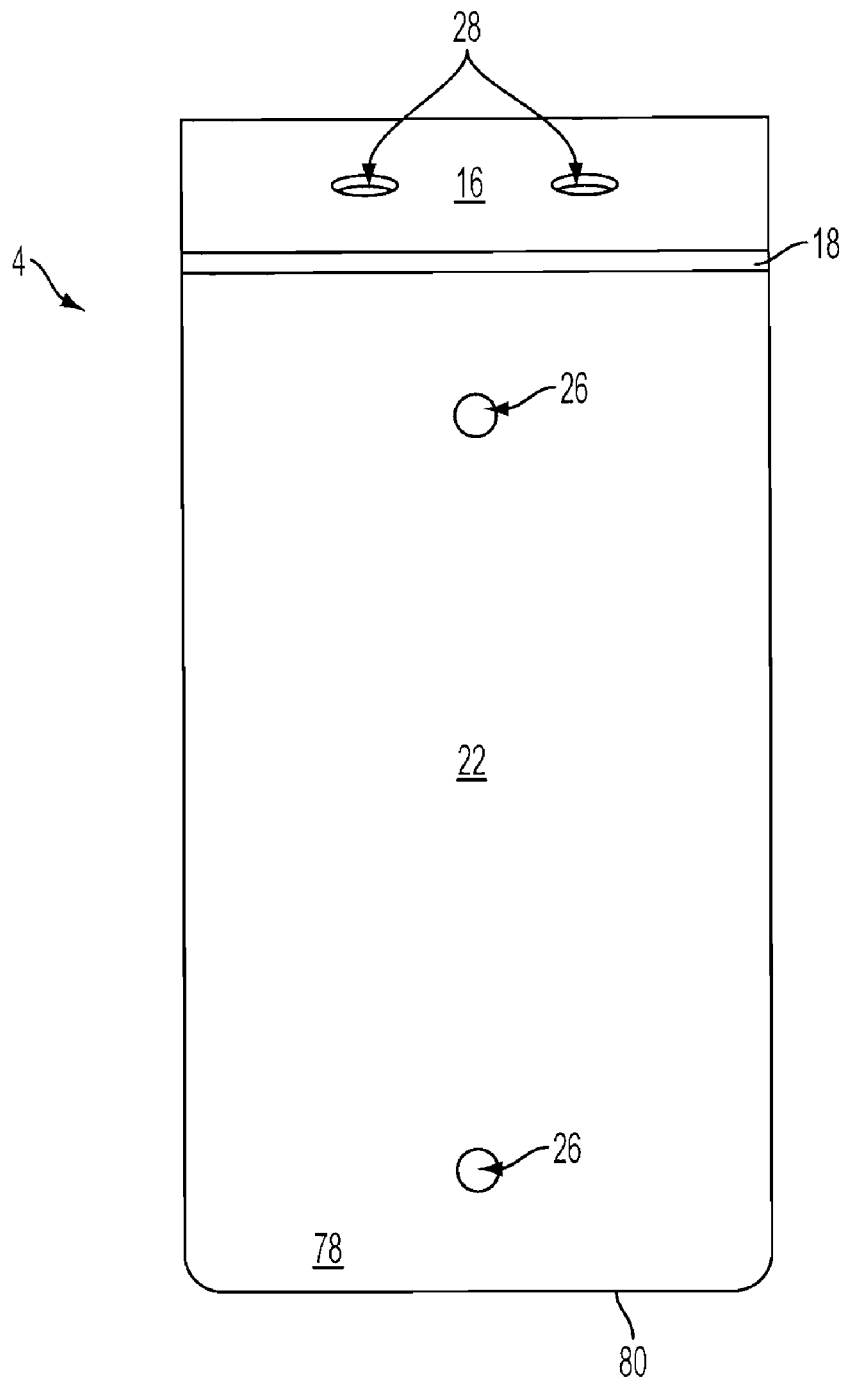
FIG. 6 is a front perspective view of the bracket of FIG. 4.

As shown in FIGS. 4 to 6, the bracket 4 has a top plate 16, with a front end 18 and a back end 20 opposite the front end 18. The bracket 4 also has a front leg 22 which is connected to the front end 18 and a back leg 24 which is connected to the back end 20. The front leg 22 is generally perpendicular to the top plate 16 and has a bottom end 80. The back leg 24 has a top end 64 and a bottom end 66. The bracket 4 is made of folded sheet metal, but could also be made of other suitable materials such as plastic or thermoformed foam.

As can be seen from FIG. 5, both legs 22 and 24 extend in the same direction away from the top plate 16. The back leg 24 is inclined towards the front leg 22. However, it is contemplated that the back leg 24 could not be inclined towards the front leg 22.

The front leg 22 and the top plate 16 both have apertures 26 and 28, respectively, as best seen in FIG. 4. The apertures 26 in the front leg 22 are used to fasten the mounting plate 10 to the front leg 22 using threaded fasteners 27 (FIG. 2). The mounting plate 10 is fastened generally parallel to the front leg 22. To fasten the mounting plate 10 to the front leg 22, the fasteners 27 are first inserted through the apertures 26 and then in the corresponding apertures 30 in the mounting plate 10, such that when the security camera assembly 2 is installed, on a door 36 for example, heads of the fasteners 27 are disposed between the front leg 22 and the door 36. Therefore, the heads of the fasteners 27 cannot be accessed when the security camera assembly 2 is installed. It should be understood that any suitable fastener may be used to attach the mounting plate 10 to the front leg 22 by disposing one fastener in one of the apertures 26 in the front leg 22 and in a corresponding aperture 30 (FIG. 8) in the mounting plate 10.

The apertures 28 in the top plate 16 may optionally be employed to fasten the bracket 4 to a top or side 38 of a door 36. However, as explained below, it is not necessary to fasten the bracket 4 to the door 36 via fasteners disposed in the apertures 28 to ensure a proper mounting of the security camera assembly 2.

Figure 7:
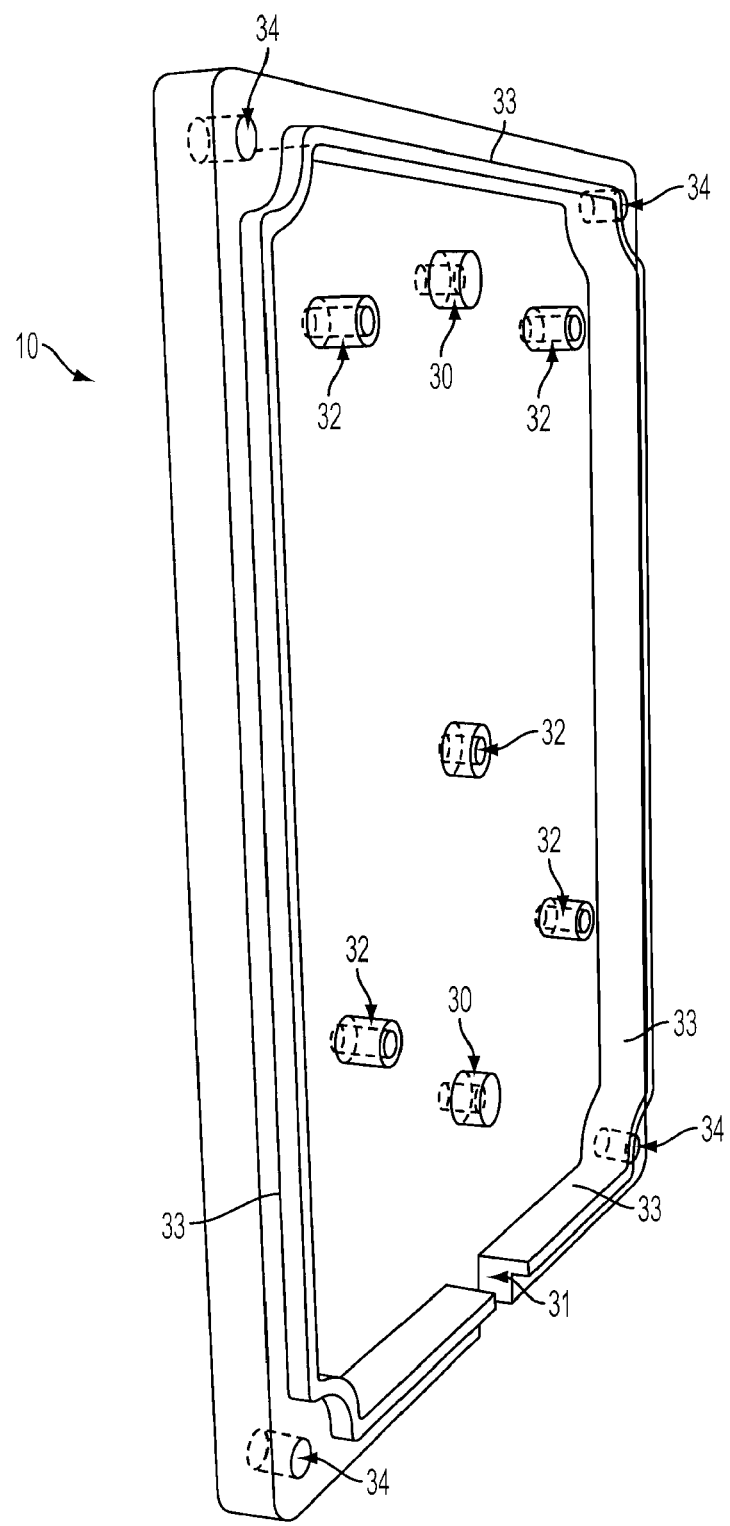
FIG. 7 is a perspective view, taken from a front, right side of the mounting plate of the security camera assembly of FIG. 1.
Figure 8:
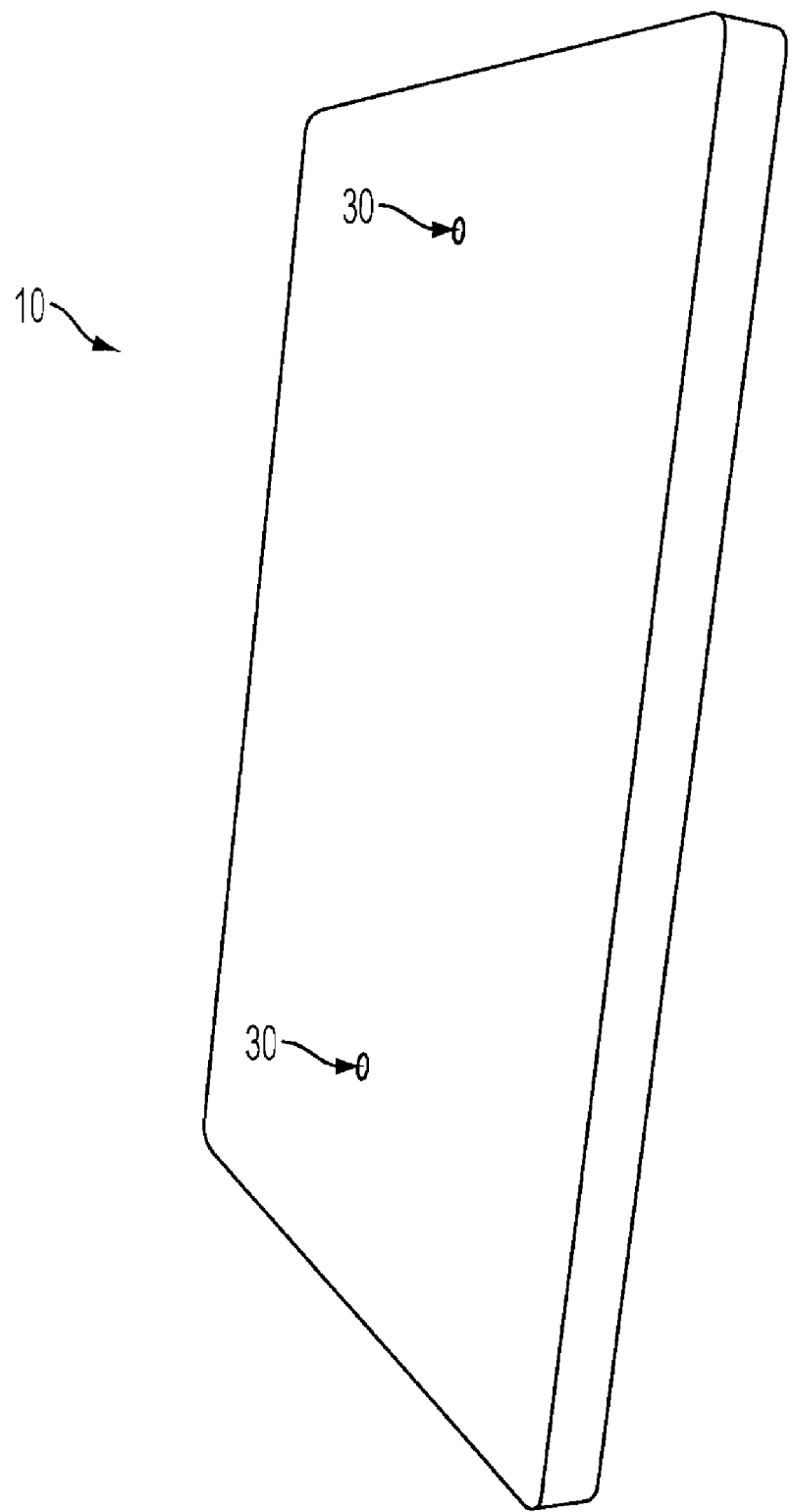
FIG. 8 is a perspective view, taken from a rear, right side of the mounting plate of FIG. 7.

FIGS. 7 and 8 show the mounting plate 10 with the apertures 30 for fastening the mounting plate 10 to the front leg 22, as described above. The mounting plate 10 also has apertures 32 for connecting the camera 12 to the mounting plate 10 as described in greater detail below. The mounting plate 10 has a passage 31 in the lower one of the sides 33 as shown in FIG. 7. The passage 31 is used for disposing a camera wire 50 therein, as described in more detail below. The mounting plate 10 also has apertures 34 for fastening the housing 6 to the mounting plate 10 by disposing the fasteners 14 (FIG. 9) in the apertures 34 shown in FIG. 7 and in the corresponding openings 15 in the housing 6. It is contemplated that any one or more of the apertures 30, apertures 32, the passage 31, and the apertures 34 could be omitted in alternative embodiments.

In an alternative embodiment, it is contemplated that the mounting plate 10 could be omitted and that the housing 6 could be directly connected to the bracket 4 by fastening the housing 6 directly to the front leg 22 of the bracket 4 using suitable fasteners. It is also contemplated that the mounting plate 10 could be integrally formed with the bracket 4.

Figure 10:
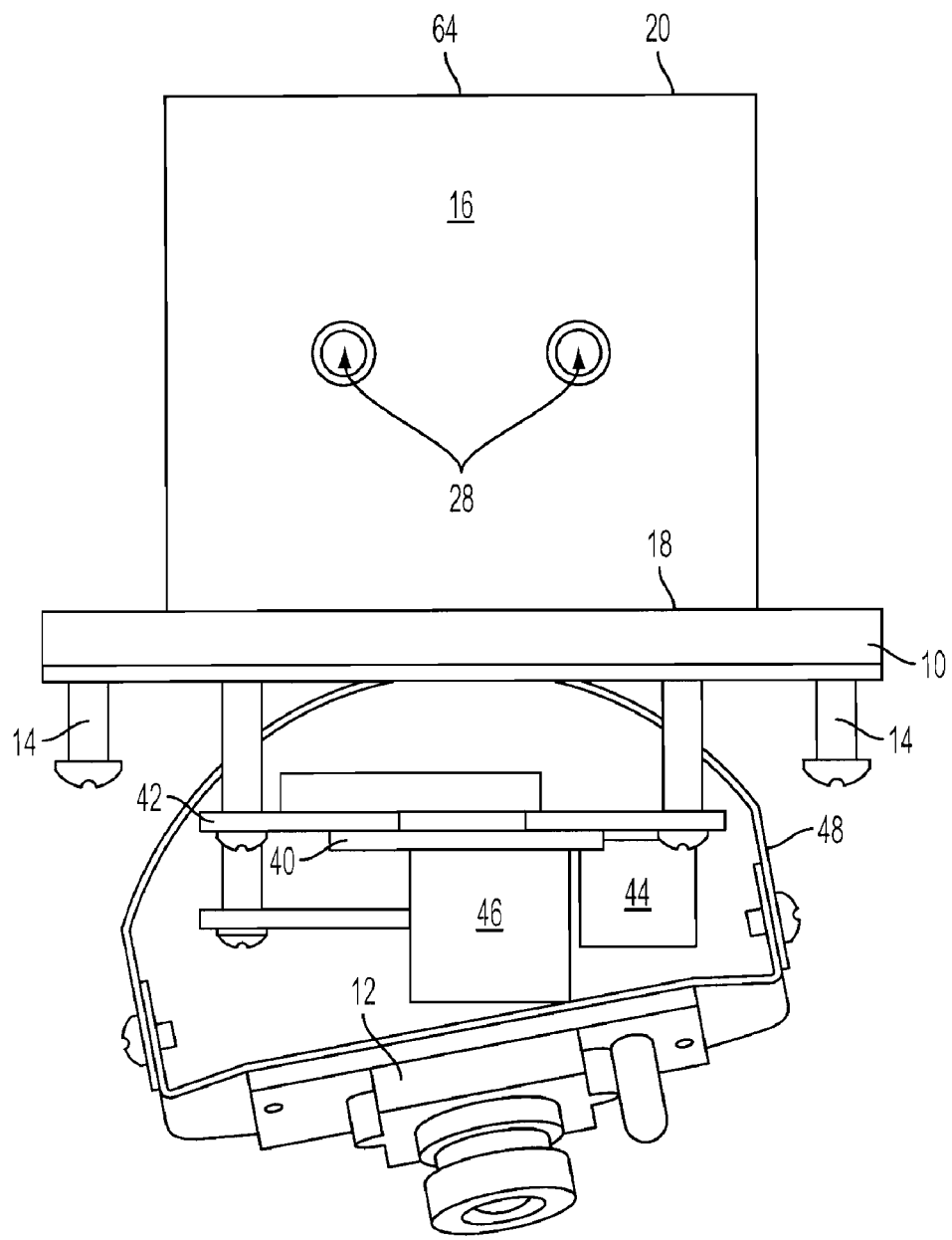
FIG. 10 is a top view of the assembly of FIG. 9.

FIGS. 9 and 10 show the security camera assembly 2 without the housing 6, thus exposing the camera receiving space 8. As can be seen, the camera receiving space 8 contains the camera 12, a flat ribbon cable connector 40, a camera board 42, a power connector block 44, an Ethernet connector 46, and an arch bracket 48 disposed therein. The flat ribbon cable connector 40, the camera board 42, the power connector block 44, and the Ethernet connector 46 allow for the proper operation of the camera 12, provide power to the camera 12 and allow image data to be transmitted from the camera 12. The camera 12 is pivotally connected to the arch bracket 48, thus allowing the camera 12 to be rotated up and down. The arch bracket 48 is movably attached to the mounting plate 10 via suitable fasteners which allow a lateral movement along a circumference of the arch bracket 48 of a limited section of the arch bracket 48 with respect to a fixed point on the mounting plate 10, thus allowing the camera 12 to be rotated left or right. In the embodiment shown in FIGS. 9 and 10, the flat ribbon cable connector 40, the power connector block 44 and the Ethernet connector 46 are attached to the camera board 42. The camera board 42 is fastened to the mounting plate 10. However, it is contemplated that the camera 12, the flat ribbon connector 40, the camera board 42, the power connector block 44, the Ethernet connector 46, and the arch bracket 48 may be connected, assembled together and mounted onto the mounting plate 10 in other ways, as would be known to a person skilled in the art, and their assembly is not limited to this particular embodiment and configuration. It is contemplated that any of the flat ribbon cable connector 40, the camera board 42, the power connector block 44, the Ethernet connector 46, or the arch bracket 48 could be removed or replaced by other elements which allow proper operation of the camera 12 by providing power to the camera 12 and by allowing image data transmittal from the camera 12. For example, the Ethernet connector 46 could be replaced by a wireless communication module.

A flat wire 49, shown in phantom in FIG. 9, is connected to the flat ribbon connector 40 and to a corresponding flat ribbon connector (not shown) behind the camera 12, to permit a wired image data transmittal from the camera 12 to the camera board 42 for processing and packaging of the image data in a suitable format to be displayed by an end application. It is contemplated that the flat wire 49 could alternatively be round and be connected to a corresponding round wire connector. It is also contemplated that the flat wire 49 could be replaced by a plurality of wires.

The camera wire 50, shown in phantom in FIG. 9, is connected to the power connector block 44 and the Ethernet connector 46 to permit wired image data transmittal from the camera board 42 and/or power transmittal to the camera 12. The camera wire 50 is preferably a flat wire so as to fit between the top 38 of a door 36 and a top of a corresponding door frame (not shown) when the security camera assembly 2 is installed as described below. It is contemplated that the camera wire 50 could alternatively be round and connected to a corresponding round wire connector. It is also contemplated that the camera wire 50 could be replaced by a plurality of wires, for example, one wire connected to the power connector block 44 and one wire connected to the Ethernet connector 46. It is also contemplated that the camera wire 50 could be connected only to the Ethernet connector 46, provided that the camera 12 supports power over Ethernet.

Figure 11:
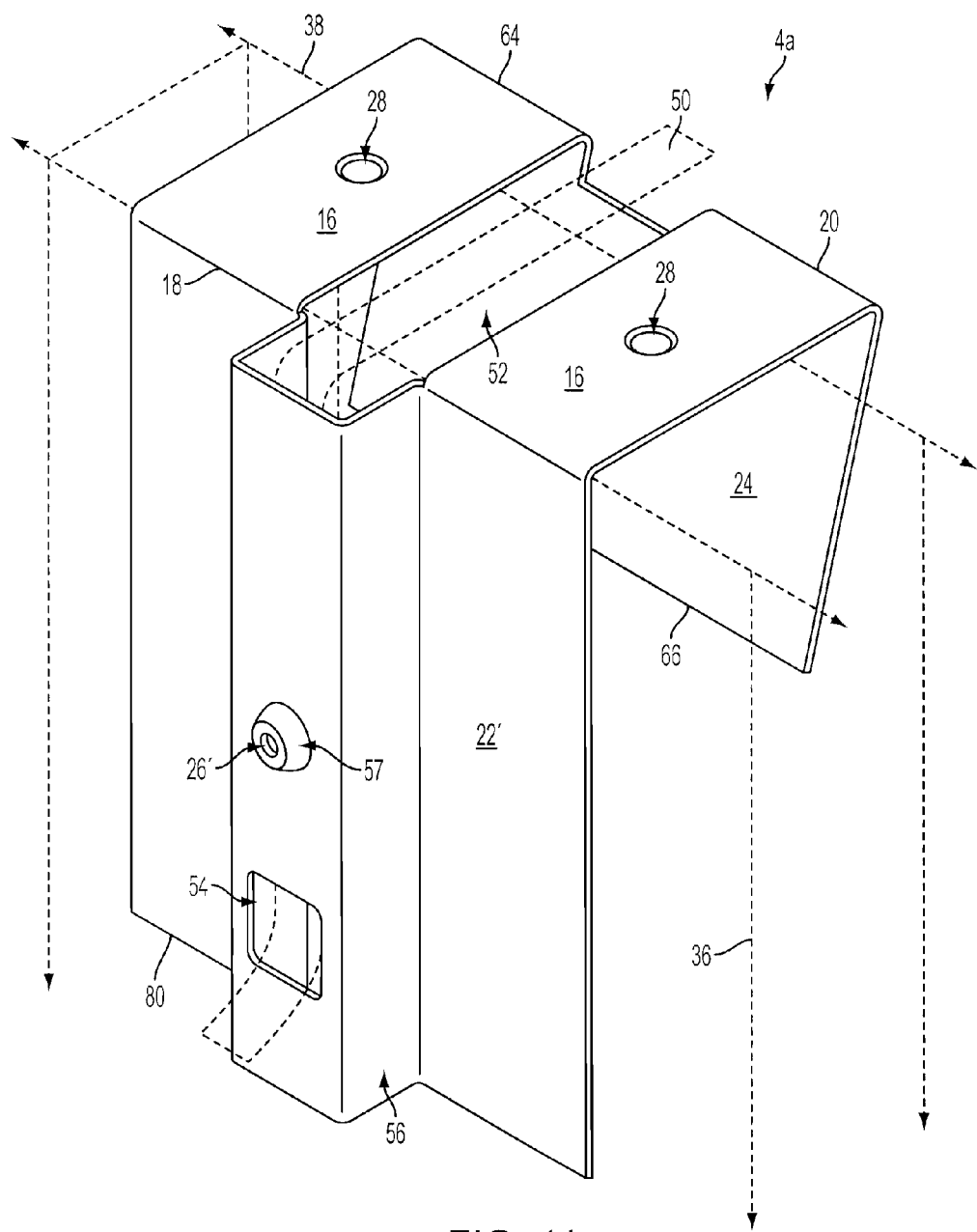
FIG. 11 is a perspective view, taken from a front, left side of an alternative embodiment of the bracket of the security camera assembly of FIG. 1.

An alternative embodiment of the bracket 4, a bracket 4a, is shown in FIG. 11. For simplicity, elements of the bracket 4a which are similar to those of the bracket 4 have been numbered with the same reference numbers and will not be described again. The bracket 4a has an indentation 56 in a front leg 22' and an aperture 54 in the indentation 56. The camera wire 50 extends from the power connector block 44 and the Ethernet connector 46, passes through an aperture (not shown) in an alternative embodiment (not shown) of the mounting plate 10, which corresponds to the aperture 54, then passes through the aperture 54 and then along the inner side of the indentation 56. A passage 52 for the camera wire 50 is provided in the top plate 16 and extends from the front leg 22' to the back leg 24. The camera wire 50 is disposed in the passage 52, such that it passes from the front end 18 to the back end 20 of the top plate 16 above the top 38 of the door 36. It is contemplated that one or more of the passage 52, the indentation 56 and the aperture 54 could be omitted. It should be understood that the alternative embodiment of the mounting plate 10 used with the bracket 4a is designed to match a shape of the front leg 22' and be fastened to the front leg 22' by disposing a fastener in an aperture 26' and in a corresponding aperture in the alternative embodiment of the mounting plate 10. The aperture 26' for disposing a fastener therein for fastening the alternative embodiment of the mounting plate 10 to the front leg 22' is located in a second indentation 57 located on the indentation 56. The second indentation 57 provides a space for the head of the fastener disposed in the aperture 26', such that this fastener does not block the passage of the camera wire 50 inside the indentation 56. It is contemplated that the indentation 57 could be omitted.

Figure 12:
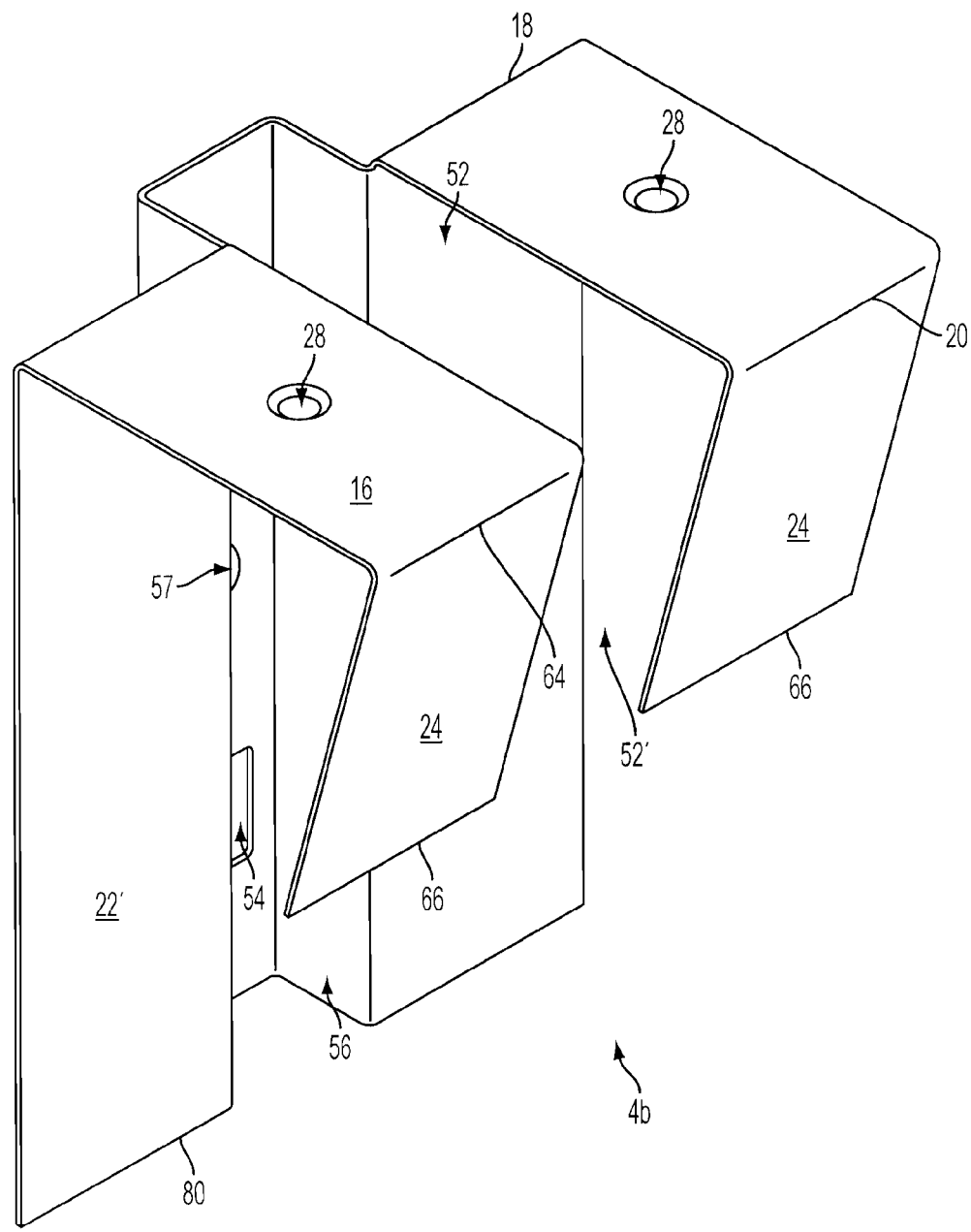
FIG. 12 is a perspective view, taken from a rear, left side of yet another alternative embodiment of the bracket of the security camera assembly of FIG. 1.

Another embodiment of the bracket 4, a bracket 4b, is shown in FIG. 12. For simplicity, elements of the bracket 4b which are similar to those of the brackets 4 and 4a have been numbered with the same reference numbers and will not be described again. The bracket 4*b* has a passage 52' for the camera wire 50 provided in the back leg 24. The passage 52' extends from the top end 64 to the bottom end 66 of the back leg 24' as a prolongation of the passage 52 in the top plate 16.

Figure 13:
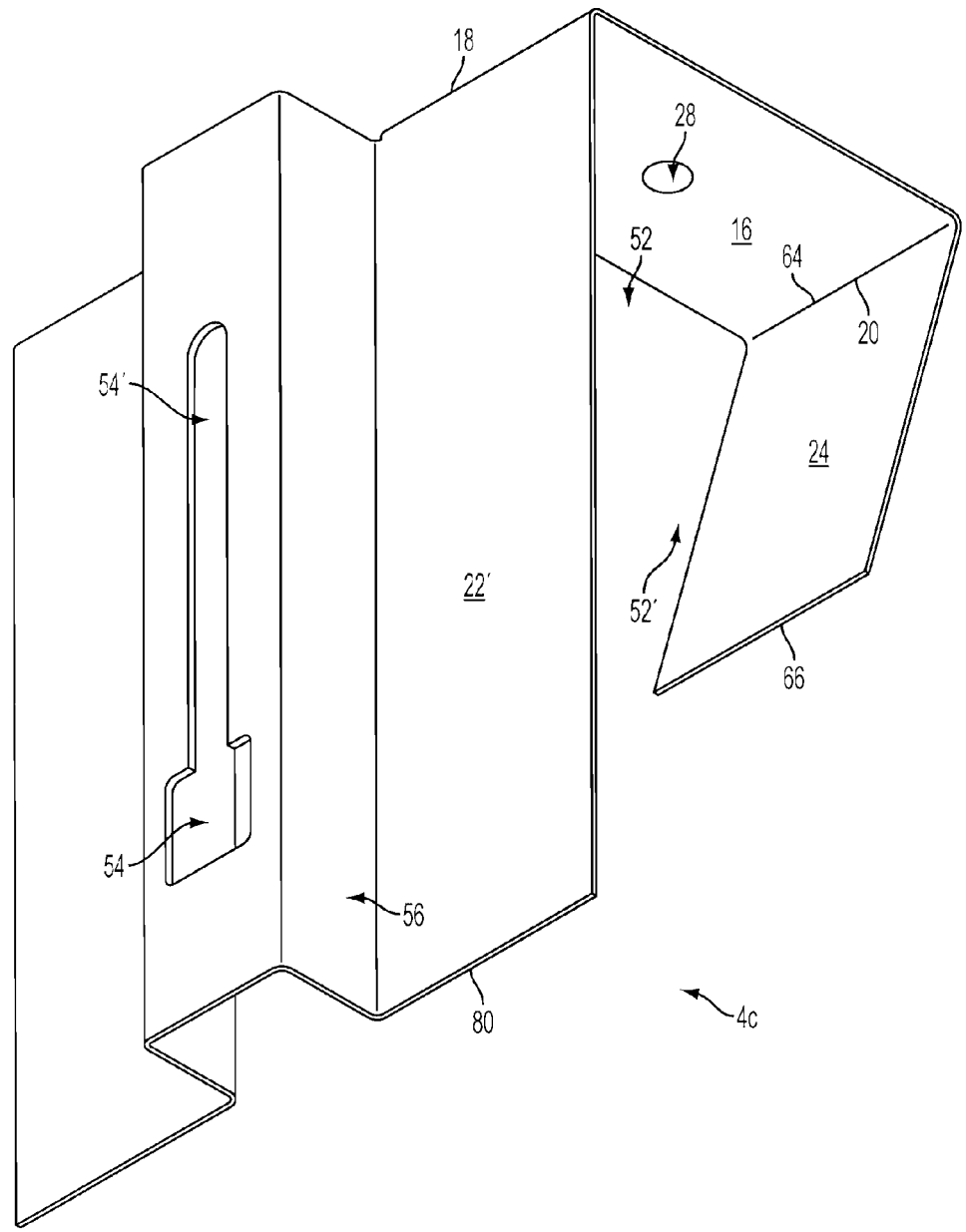
FIG. 13 is a perspective view, taken from a front, left side of yet another alternative embodiment of the bracket of the security camera assembly of FIG. 1.

Another embodiment of the bracket 4, bracket 4*c*, is shown in FIG. 13. For simplicity, elements of the bracket 4*c* which are similar to those of the brackets 4, 4*a* and 4*b* have been numbered with the same reference numbers and will not be described again. The bracket 4*c* has a passage 54' extending through a center of the indentation 56 from the aperture 54 in a direction of the top plate 16. The second indentation 57 and the aperture 26' of the bracket 4*b* (shown in FIG. 12) are thus omitted from the bracket 4*c*. The passage 54' provides a space for a fastener for fastening the alternative embodiment of the mounting 10 to the front leg 22' such that the fastener can be moved from a first position to a second position along a longitudinal length of the passage 54'.

Figure 14:
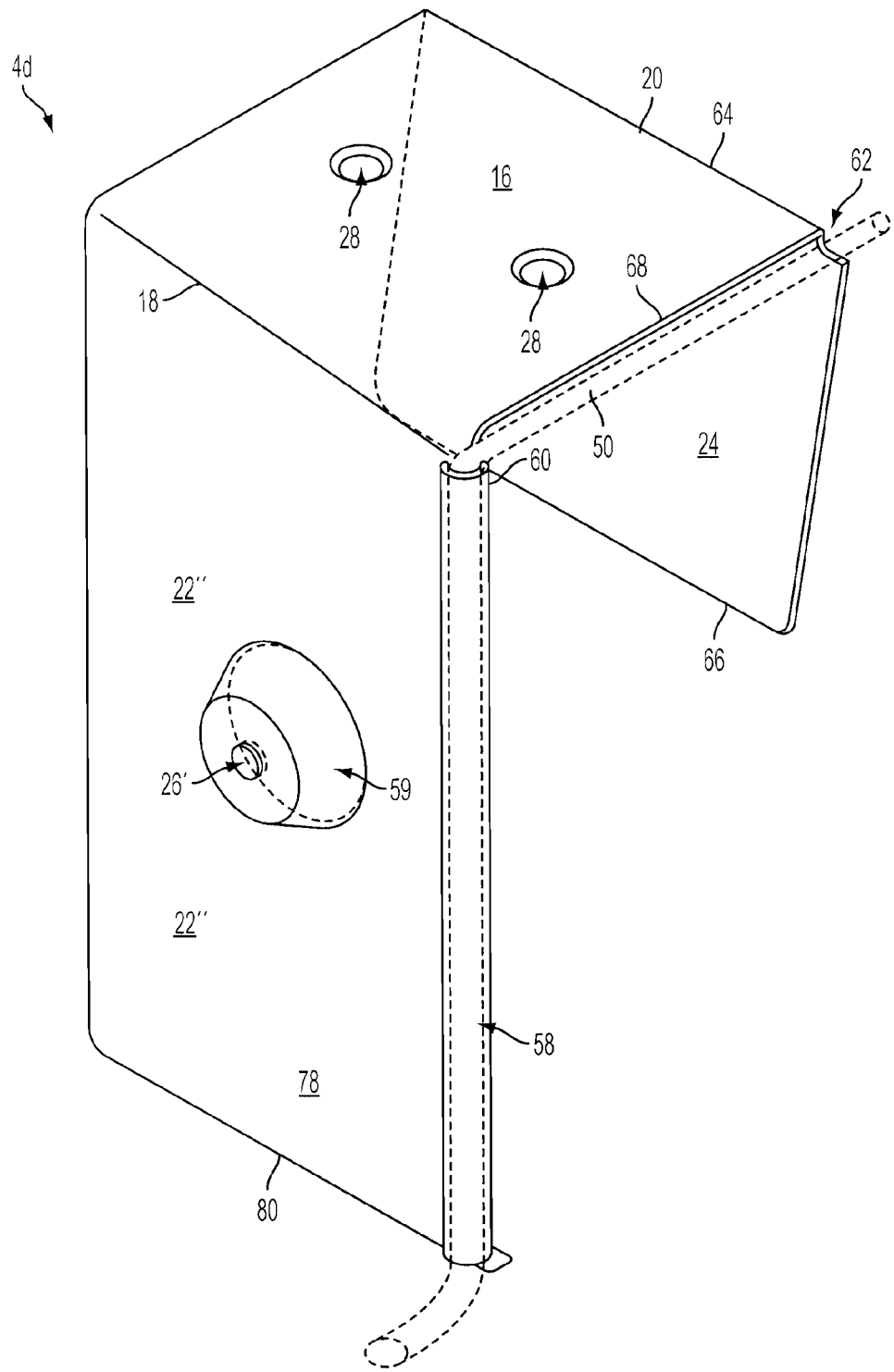
FIG. 14 is a perspective view, taken from a front, left side of yet another alternative embodiment of the bracket of the security camera assembly of FIG. 1.

Another embodiment of the bracket 4, bracket 4*d*, is shown in FIG. 14. For simplicity, elements of the bracket 4*d* which are similar to those of the bracket 4 have been numbered with the same reference numbers and will not be described again. The bracket 4*d* has a side conduit 58 extending along one of the sides of a front leg 22". The conduit 58 has a generally circular cross-section 60 and is configured to enclose the camera wire 50. The top plate 16 has a recess 62 extending from the front end 18 to the back end 20 along a side 68 of the top plate 16 on the same side as the conduit 58. The recess 62 allows the passing of the camera wire 50 along the side 68 of the top plate 16. The camera wire 50 extends from the power connector block 44 and the Ethernet connector 46, passes through the passage 31 of an alternative embodiment of the mounting plate 10 (similar to passage 31 shown in FIG. 9), passes through the conduit 58, and passes through the recess 62 above the top 38 of the door 36 (FIG. 11). Similarly to the bracket 4*a*, in the bracket 4*d*, the aperture 26' for disposing a fastener therein while fastening the mounting plate 10 to the front leg 22" is located in an indentation 59. It should be understood that the alternative embodiment of the mounting plate 10 has an aperture corresponding to the aperture 26' of the bracket 4*d*. It is contemplated that the indentation 59 could be omitted. It is also contemplated that alternative embodiment of the mounting plate 10 could be designed to match a shape of the front leg 22".

Figure 15:
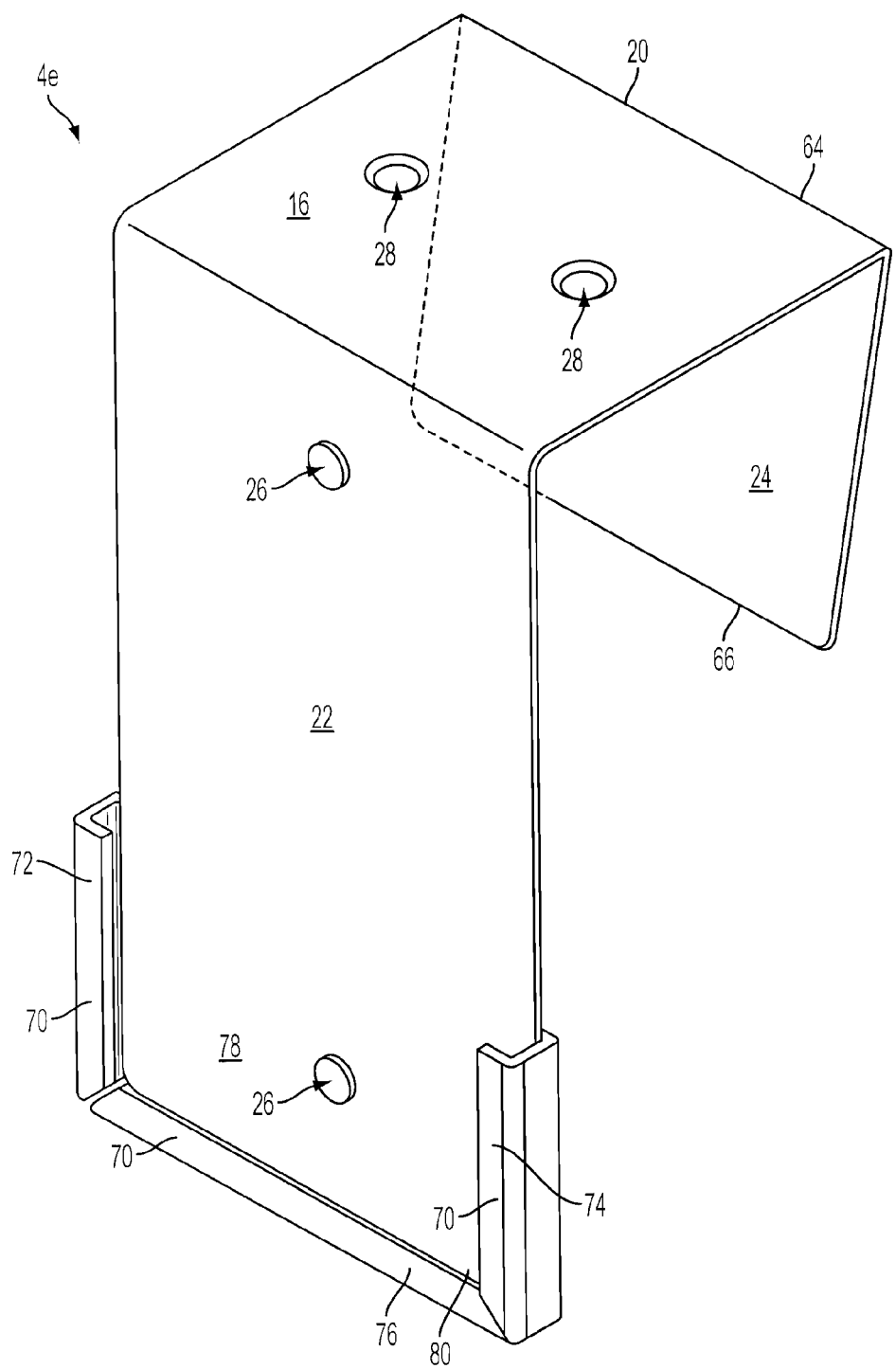
FIG. 15 is a perspective view, taken from a front, left side of yet another alternative embodiment of the bracket of the security camera assembly of FIG. 1.
Figure 16:
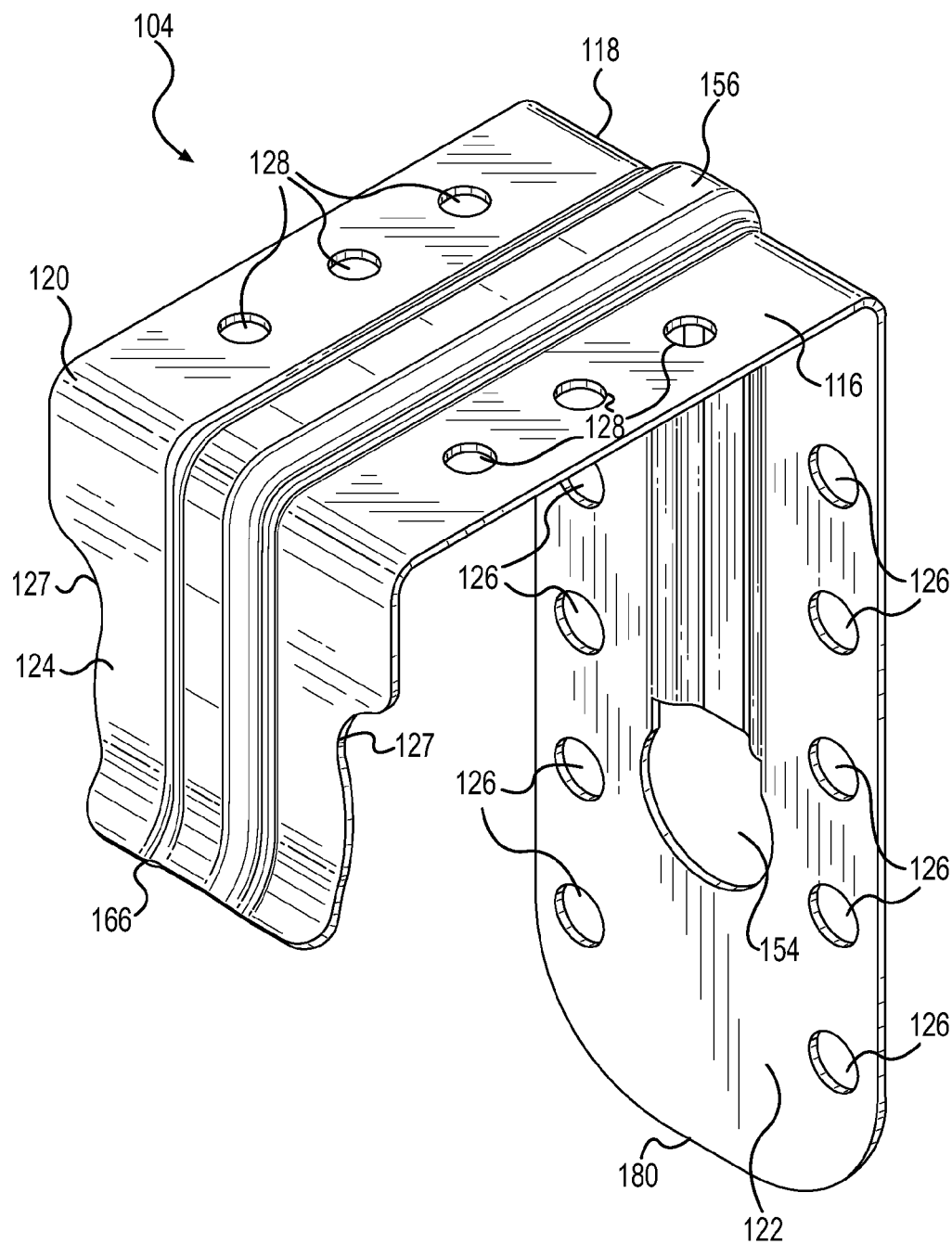
FIG. 16 is a perspective view, taken from a rear, right side of another alternative embodiment of the bracket of the security camera assembly of FIG. 1.

An additional embodiment of the bracket 4, bracket 4*e*, is shown in FIG. 15. For simplicity, elements of the bracket 4*e* which are similar to those of the bracket 4 have been numbered with the same reference numbers and will not be described again. A slide-in element 70 is located on the front leg 22 of the bracket 4*e*. The slide-in element 70 comprises three extensions 72, 74, and 76. The extensions 72 and 74 are generally L-shaped and extend along the sides of the lower section 78 of the front leg 22. The extension 76 is generally flat and extends along a bottom end 80 of the front leg 22. The three extensions 72, 74 and 76 are configured to receive the mounting plate 10, which is slid into the slide-in element 70 defined by the three extensions 72, 74, and 76. Since the slide-in element 70 provides the connection for the mounting plate 10, the use of fasteners through the aperture 26 for connecting the mounting plate 10 to the front leg 22 is optional.

Figure 17:
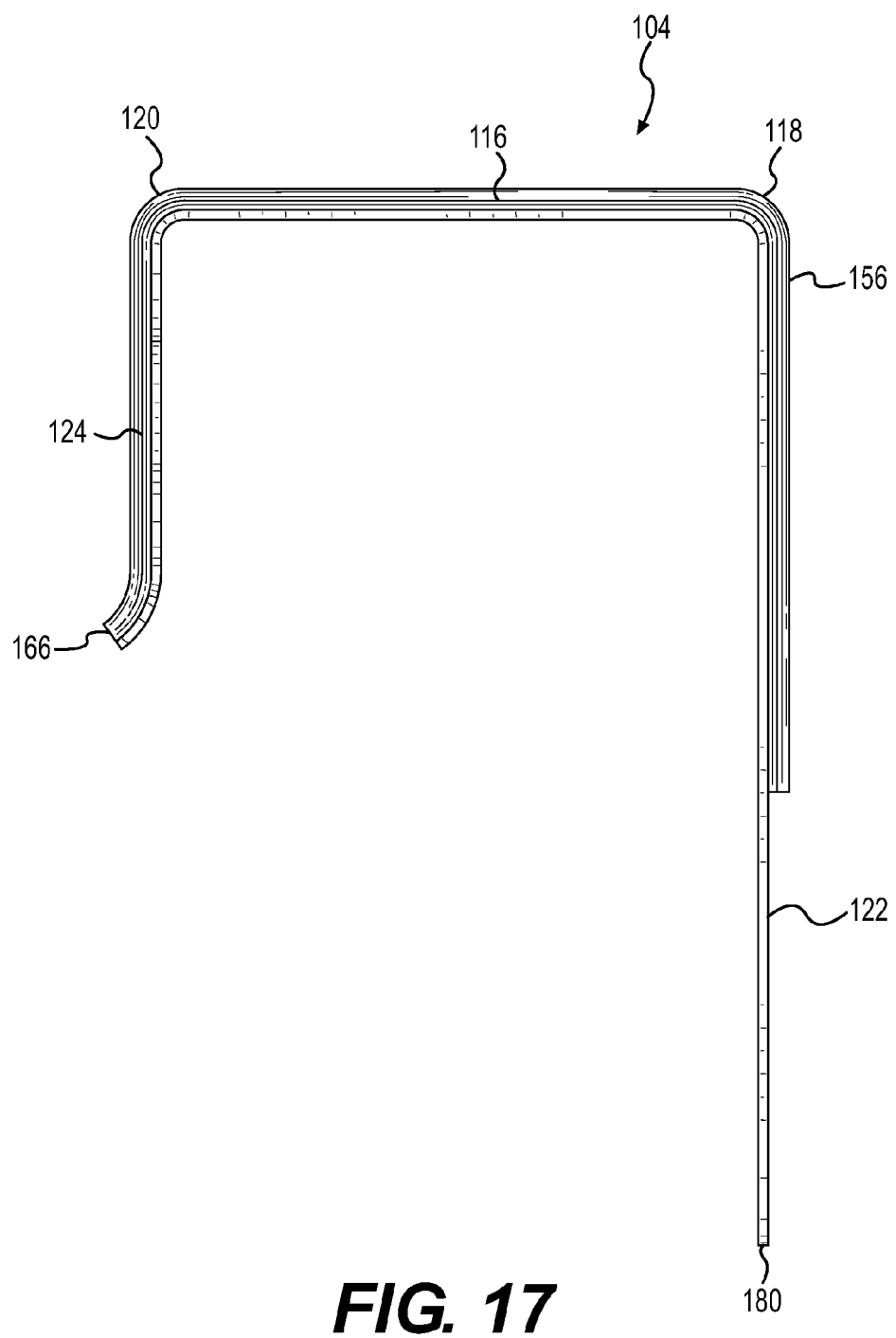
FIG. 17 is a right side view of the bracket of FIG. 16.

An additional embodiment of the bracket 4, bracket 104, is shown in FIGS. 16 to 19. The bracket 104 has a top plate 116, with a front end 118 and a back end 120 opposite the front end 118. The bracket 104 also has a front leg 122 which is connected to the front end 118 and a back leg 124 which is connected to the back end 120. The front leg 122 is generally perpendicular to the top plate 116 and has a bottom end 180. The back leg 124 is generally perpendicular to the top plate 116 and has a bottom end 166. It is contemplated that the back leg 124 could be inclined towards the front leg 122. As best seen in FIG. 17, the bottom end 166 of the back leg is curved away from the front leg 122. This curving facilitates the sliding of the bracket 104 onto the door 36 when installing the bracket 104. The bracket 104 is made of sheet metal, but could also be made of other suitable materials such as plastic.

Figure 18:
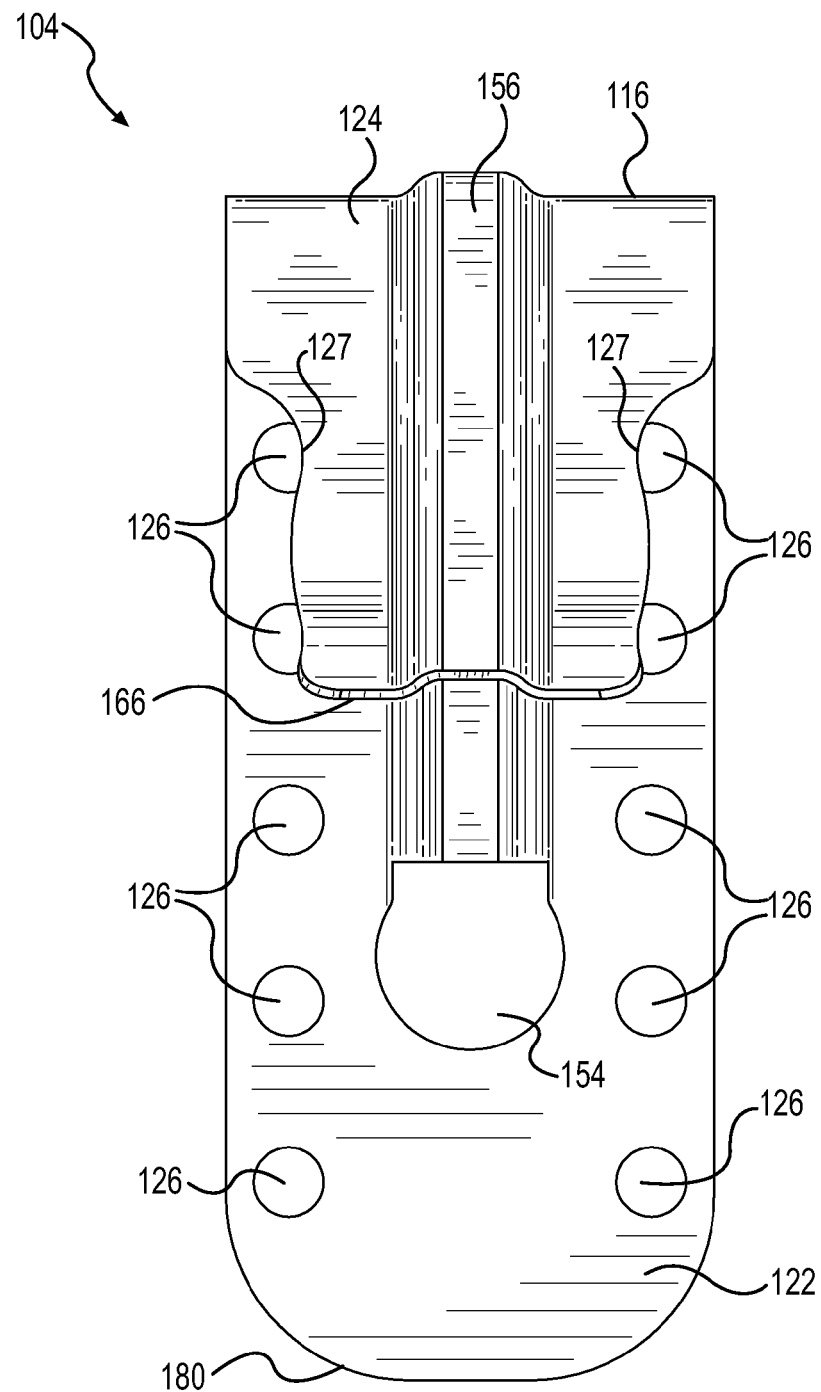
FIG. 18 is a rear view of the bracket of FIG. 16.
Figure 19:
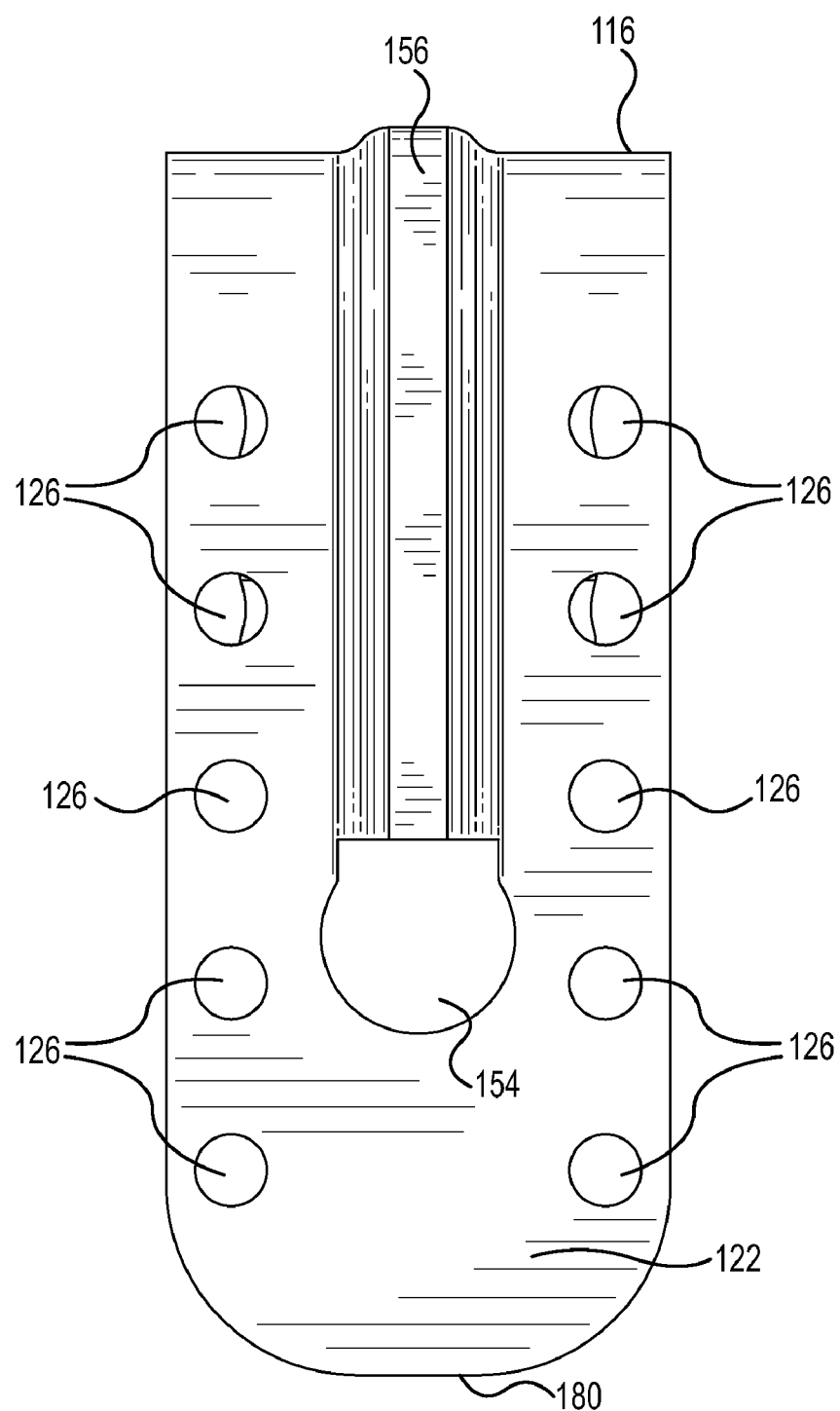
FIG. 19 is a front view of the bracket of FIG. 16.

The front leg 122 and the top plate 116 both have apertures 126 and 128 respectively. The apertures 126 in the front leg 122 are used to fasten an alternative embodiment of the mounting plate 10 to the front leg 122 using threaded fasteners. The alternative embodiment of the mounting plate 10 is provided with apertures corresponding to the apertures 126. To fasten the alternative embodiment of the mounting plate 10 to the front leg 122, the fasteners are first inserted through the apertures 126 and then in the corresponding apertures in the alternative embodiment of the mounting plate 10, such that when the security camera assembly 2 is installed, on a door 36 for example, heads of the fasteners are disposed between the front leg 122 and the door 36. Therefore, the heads of the fasteners cannot be accessed when the security camera assembly 2 is installed. It should be understood that any suitable fastener may be used to attach the alternative embodiment of the mounting plate 10 to the front leg 122. To facilitate fastening of fasteners in the top four aperture 126 of the front leg 122, the back leg 124 has indentations 127 formed therein, as best seen in FIG. 18. The indentations 127 permit easier access to fasteners in the top four aperture 126 of the front leg 122 with a screwdriver for example.

The apertures 128 in the top plate 116 may optionally be employed to fasten the bracket 104 to a top or side 38 of a door 136. However, as explained below, it is not necessary to fasten the bracket 104 to the door 36 via fasteners disposed in the apertures 128 to ensure a proper mounting of the security camera assembly 2. As such, it is contemplated that the apertures 128 could be omitted.

The bracket 104 has an aperture 154 in the front leg 122. A channel 156 is disposed above the aperture 154 and extends along the front leg 122 to the top of the front leg 122, along the top plate 116 from the front end 118 to the back end 120 of thereof, and along the back leg 124 to the bottom end 166 thereof. The channel 156 has a generally trapezoid cross-section defining a passage therein, but it is contemplated that it could have other shapes. The camera wire 50 extends from the power connector block 44 and optionally the Ethernet connector 46, passes through an aperture in an alternative embodiment of the mounting plate 10, which corresponds to the aperture 154, then passes through the aperture 154 and then along the inner side of the channel 156 in the passage defined by the channel 156 along the entire length thereof. As a result, the camera wire 50 is routed from the camera 12 on one side of the door 36, up and over the door 36, and then down on the other side of the door 36.

For simplicity, only the mounting of the security camera assembly 2 having the bracket 4 onto the top 38 of the door 36 will now be described in detail. As should be understood, the mounting of the security camera assembly 2 would be similarly achieved when mounting the security camera assembly 2 onto a top or side of a window frame or a fence, or a side of a door, and/or when using the brackets 4*a*, 4*b*, 4*c*, 4*d*, 4*e* or 104.

In order to mount the security camera assembly 2 onto a door 36, once the security camera assembly 2 is assembled as shown in FIG. 1, the bracket 4 is slid over the top 38 of the door 36, such that the door 36 is disposed between the front 22 and back 24 legs of the bracket 4 and the top plate 16 of the bracket 4 is disposed onto the top 38 of the door 36 as shown in phantom in FIG. 3. The bracket 4 is secured on the door 36 by a clamping force, produced by the front leg 22 and the back leg 24 of the bracket 4, acting on the surface of the door 36. The clamping force is produced because a distance between the front leg 22 and a bottom end 66 of the back leg 24, as shown in FIG. 3, is smaller than a width of the door 36, such that the back leg 24 is biased against the surface of the door 36, and because the back leg 24 is inclined towards the front leg 22 as seen in FIG. 3. Since the bracket 4 rests on the top 38 of the door 36, the need for fasteners to attach the bracket 4 to the door 36 is eliminated, thus allowing rapid and easy installation of the security camera assembly 2. The biasing effect of the legs 22 and 24 help maintain the security camera assembly 2 in position. It is, however, contemplated that fasteners could be inserted in the apertures 28 in the top plate 16 of the bracket 4 and the top 38 of the door 36 to provide a more permanent installation.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A security camera assembly comprising:
   a bracket including:
      a top plate having a front end and a back end;
      a front leg having a top end and a bottom end, the top end of the front leg being connected to the front end of the top plate, the front leg extending from the front end of the top plate in a first direction generally perpendicular to the top plate, the bottom end of the front leg begin space from the top plate in the first direction;
      a back leg extending from the back end of the top plate generally in the first direction; and
      at least one passage extending in the top plate from the front leg to the back leg;
   a housing connected to the front leg of the bracket, the housing and the front leg of the bracket defining therebetween a camera receiving space, a top of the housing being disposed between the top plate and the bottom end of the front leg in the first direction; and
   a camera disposed in the camera receiving space, the camera having at least one wire extending therefrom, a portion of the wire being disposed in the at least one passage and extending at least to the back end of the top plate.

2. The security camera assembly of claim 1, further comprising a mounting plate connected to the front leg, the mounting plate being generally parallel to the front leg;
   wherein the housing is connected to the mounting plate, and the camera receiving space is defined between the housing and the mounting plate.

3. The security camera assembly of claim 2, wherein the mounting plate is connected to the front leg by at least one fastener disposed in at least one aperture in the mounting plate and in at least one corresponding aperture in the front leg.

4. The security camera assembly of claim 1, wherein the back leg is inclined towards the front leg.

5. The security camera assembly of claim 4, wherein the back leg has a top end attached to the back end of the top plate and a bottom end opposite the top end; and
   a distance from the bottom end of the back leg to the front leg is smaller than a width of one of a door, a window frame, and a fence for which the security camera assembly is configured to be mounted onto, such that the back leg is biased against the one of the door, the window frame, and the fence when mounted thereon.

6. The security camera assembly of claim 1, wherein the at least one passage is defined by a channel extending along the top plate from the front leg to the back leg.

7. The security camera assembly of claim 6, wherein the channel also extends along at least a portion of the front leg and at least a portion of the back leg.

8. The security camera assembly of claim 1, wherein a bottom end of the back leg curves away from the front leg.

9. A method for mounting a security camera assembly onto one of a door, a window frame, and a fence, the security camera assembly having a bracket, the bracket including a top plate having a front end and a back end, a front leg extending from the front end of the top plate in a first direction generally perpendicular to the top plate, and a back leg extending from the back end of the top plate generally in the first direction, the method comprising:
   connecting a camera to the front leg of the bracket;
   connecting a housing to the front leg of the bracket such that the camera is disposed between the housing and the bracket in a direction parallel to the top plate and perpendicular to the first direction, a top of the housing being disposed between the top plate and a bottom end of the front leg in the first direction;
   sliding the bracket onto one of a top and a side of the one of the door, the fence, and the window frame such that the top plate rests on the one of the top and the side of the one of the door, the fence, and the window frame; and
   disposing a camera wire in at least one passage extending through the top plate from the front leg to the back leg, the wire extending at least to the back end of the top plate.

10. The method of claim 9, further comprising connecting a mounting plate to the front leg such that the mounting plate is generally parallel to the front leg;
    wherein connecting the camera to the front leg includes connecting the camera to the mounting plate; and
    wherein connecting the housing to the front leg includes connecting the housing to the mounting plate.

11. The method of claim 10, wherein connecting the mounting plate to the front leg includes fastening the mounting plate to the front leg by disposing at least one fastener in at least one aperture located in the mounting plate and at least one corresponding aperture located in the front leg.

12. The method of claim 10, wherein connecting the housing to the mounting plate includes fastening the housing to the mounting plate.

13. The method of claim 9, wherein disposing the camera wire in at least one passage includes disposing the camera wire in a channel defining the at least one passage.

14. A security camera assembly comprising:
    a bracket including:
       a top plate having a front end and a back end;
       a front leg having a top end and a bottom end, the top end of the front leg being connected to the front end of the top plate, the front leg extending from the front end of the top plate in a first direction generally perpendicular to the top plate, the bottom end of the front leg being spaced from the top plate in the first direction; and
       a back leg having a top end and a bottom end, the top end of the back leg being connected to the back end of the top plate, the back leg extending from the back end of the top plate generally in the first direction, the bottom end of the back leg being spaced from the top plate generally in the first direction;

a housing connected to the front leg of the bracket, the housing and the front leg of the bracket defining therebetween a camera receiving space, the front leg being disposed between the housing and the back leg in a direction parallel to the top plate and perpendicular to the first direction, a top of the housing being disposed between the top plate and the bottom end of the front leg in the first direction; and a camera disposed in the camera receiving space, the housing being disposed outside a space defined between the camera and the front leg of the bracket.

15. The security camera assembly of claim 14, further comprising a mounting plate connected to the front leg, the mounting plate being generally parallel to the front leg;

wherein the housing is connected to the mounting plate, the camera receiving space is defined between the housing and the mounting plate, and the housing is disposed outside a space defined between the camera and the mounting plate.

16. The security camera assembly of claim 15, wherein the mounting plate is connected to the front leg by at least one fastener disposed in at least one aperture in the mounting plate and in at least one corresponding aperture in the front leg.

17. The security camera assembly of claim 14, wherein the bracket has at least one passage extending in the top plate from the front leg to the back leg; and wherein the camera has at least one wire extending therefrom, and a portion of the wire is disposed in the at least one passage.

18. The security camera assembly of claim 17, wherein the at least one passage is defined by a channel extending along the top plate from the front leg to the back leg.

19. The security camera assembly of claim 18, wherein the channel also extends along at least a portion of the front leg and at least a portion of the back leg.

20. The security camera assembly of claim 14, wherein the bottom end of the back leg curves away from the front leg.

21. The security camera assembly of claim 14, wherein the back leg is inclined towards the front leg.

22. The security camera assembly of claim 21, wherein a distance from the bottom end of the back leg to the front leg is smaller than a width of one of a door, a window frame, and a fence for which the security camera assembly is configured to be mounted onto, such that the back leg is biased against the one of the door, the window frame, and the fence when mounted thereon.

* * * * *

UNITED STATES PATENT AND TRADEMARK OFFICE
CERTIFICATE OF CORRECTION

PATENT NO. : 8,398,316 B2
APPLICATION NO. : 13/011462
DATED : March 19, 2013
INVENTOR(S) : Iwan Mota et al.

It is certified that error appears in the above-identified patent and that said Letters Patent is hereby corrected as shown below:

In the Claims:

At column 9, claim 1, line 35: the words "begin space" should be replaced with -- being spaced --.

Signed and Sealed this
Twenty-first Day of May, 2013

Teresa Stanek Rea
*Acting Director of the United States Patent and Trademark Office*